E. E. HAWLEY.
Potato-Planter.
No. 19,294.
Patented Feb. 9, 1858.
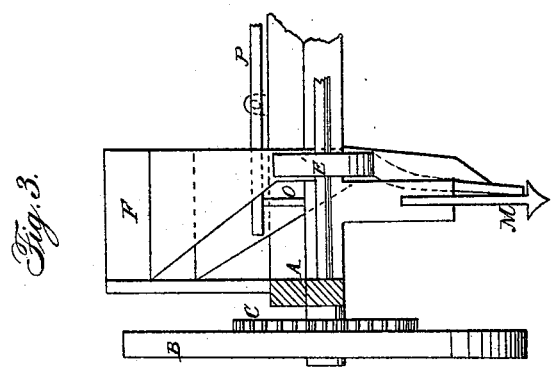
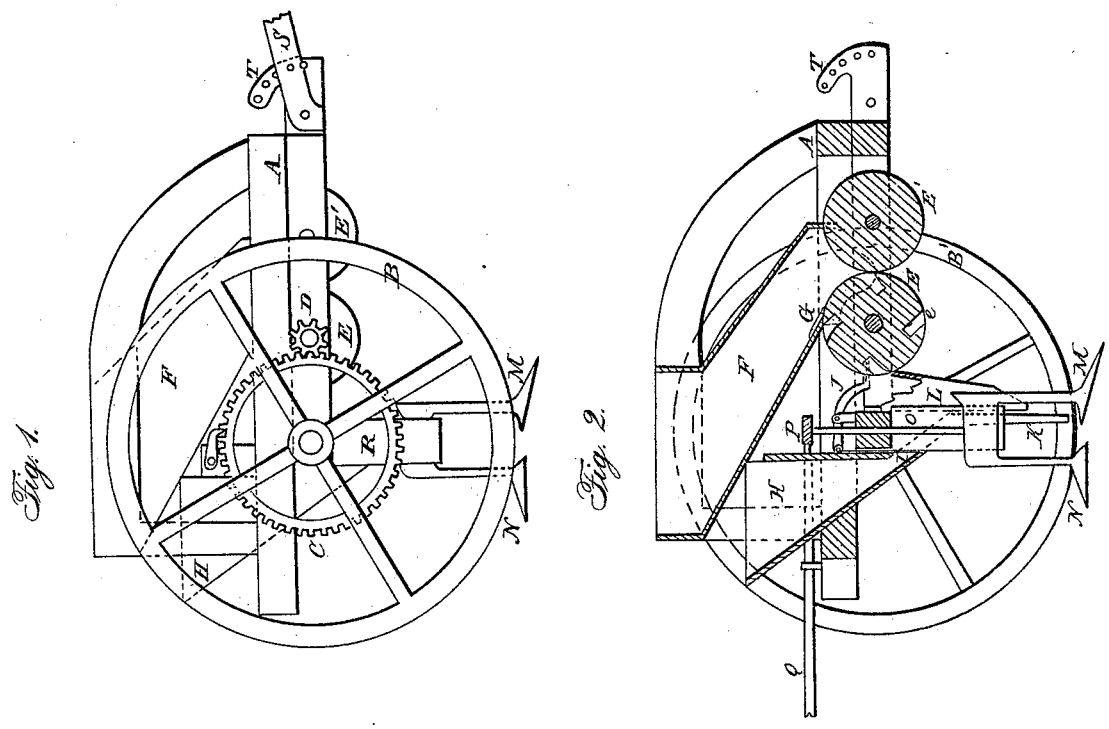

UNITED STATES PATENT OFFICE.

EDWARD E. HAWLEY, OF NEW HAVEN, CONNECTICUT.

IMPROVEMENT IN POTATO-PLANTERS.

Specification forming part of Letters Patent No. 19,294, dated February 9, 1858.

*To all whom it may concern:*

Be it known that I, EDWARD E. HAWLEY, of the city and county of New Haven and State of Connecticut, have invented certain new and useful Improvements in Potato-Planters; and I do hereby declare that the following is a full and exact description of the same, reference being had to the accompanying drawings, and to the letters of reference marked thereon, in which—

Figure 1 is a side elevation; Fig. 2, a vertical and longitudinal section; Fig. 3, an end view of one-half the width of the machine, the remainder being omitted for the sake of perspicuity.

The principal difficulty in planting potatoes by machinery that has been found to exist in practice is induced by the difference in their size and bulk, a machine that is fitted to plant a potato of particular size being unable to receive one of larger size, and being clogged and choked up by smaller ones.

The object of my invention is to remedy and overcome this objection and defect by the use of means hereinafter described, and also to deposit in the trench or furrow with the seed a definite quantity of fertilizing material, and also to form a trench or furrow in which the seed and fertilizing material are to be dropped, and to cover the same when dropped.

A is the frame of the machine, mounted upon an axle, upon which the truck-wheels B B' revolve.

C is a gear or cog wheel which revolves with the wheel B, and which gears into the pinion D to revolve the planting-wheels E E'. This gear-wheel is attached to the main axle or to the truck-wheel B in such a manner that it may be removed out of gear with the pinion D to stop the operation of the planting-wheels when the machine is moved about from place to place, or at such other times as may be required.

E E' are a pair of planting-wheels, having their peripheries placed in contact with each other, or nearly so, the first being revolved by the pinion D and the latter by a pair of equal-sized spur-gears placed on the shafts of the two wheels at any convenient point. In the periphery of the wheel E is formed a series of pockets or chambers, e, extending the whole width of the wheel, to receive the potatoes to be planted, and which stand at or about the angle shown for the purpose of being readily filled. The size of these pockets or chambers can be varied, so as to fit them for planting either whole potatoes or potatoes cut in pieces, as may be required, by filling up the bottoms of them with pieces of wood or metal, which can be inserted and secured to decrease or taken out to increase their capacity, as may be desired. A false bottom, made of metal, attached to and having a movement of about one inch up and down upon a central pin, may be placed in the bottom of each chamber or upon the top of the pieces used to decrease the capacity of the chambers, as the case may be, and which falls to the bottom of the pocket by its gravity before the tubers are received in or taken up by the pocket, and throws them out by the same action when the pocket is brought over the conductor L, which delivers them to the ground, so that the trouble which would result from the tubers hanging in and clogging up the pocket is avoided. This false bottom is not represented in the drawings, as it is too small to be shown clearly.

F is the hopper, which contains the supply of potatoes to be planted. The front and back of its lower end reach to the vertical line of the centers of the two planting-wheels and rest upon the peripheries of those wheels, and its sides are brought down upon the sides of the wheels, as shown by the dotted lines in Fig. 2, to guide and direct the tubers to the pockets described. The planting-wheels form, in fact, the bottom of the hopper, and by moving outwardly in opposite directions they tend to lighten up the potatoes and keep them from wedging in and clogging up the hopper. Upon the bottom edge of the back of the hopper is placed a thin cutting-blade, G, which cuts off a tuber or piece of one contained in the pocket passing under the blade should it project beyond the periphery of the planting-wheel E.

H is a hopper to contain the fertilizing material, which it is desired to drop with and at the same time as the potato. It has a valve, I, which covers and closes its bottom aperture, and which is raised at the time that the pockets in the wheels empty themselves of the tubers contained in them by the lever J, operated upon by pins inserted in the side of the wheel E. It is restored to its position after the pins have passed off of the tail of the lever J either by its own gravity or by a spring, as may be found best in practice. The fertilizing material drops from the bottom of the hopper through the tube K to the trench or furrow at or about the same time that the tubers drop from the pocket of the planting-wheel through the tube or conductor L, so that the two are placed in the trench together, or nearly so.

M is a cultivator, and N a coverer, which are attached to each other by a connection at the top, so that they operate together, and connected by the rod O to the cross-beam P, which is elevated or depressed by the lever Q—elevated to raise the cultivator and coverer above the surface of the ground when the machine is moved about and not used for planting, and depressed to lower them into the ground the requisite distance to effect the objects for which they are intended. The cultivator is set at such distance below the surface of the ground and at such angle as will best loosen and raise the soil to form a trench or furrow to receive the tubers dropped by the machine, and the coverer is made of about the same form, but reversed in position, and set in line with the surface of the ground, so as to gather the soil toward its center and compress it into the trench to the degree required. The top connection of the cultivator and coverer fits in a slotted aperture in the standard R, which supports and steadies it, while it allows them to be moved up and down in the manner described.

S is a frame, to which the pole or tongue by which the machine is drawn is attached. The angle made by it and the pole or tongue in relation to the frame A may be varied by raising or lowering the pin in the arc T, which confines it to place.

A duplicated planting and manuring apparatus is applied and attached to the other side of the frame A, the planting-wheels being placed on the same axles as those shown, (they being carried across the frame for that purpose,) and operated at the same time, by the same means, and in the same manner as they are. The duplicate is not shown to avoid obscuring and complicating the drawings, but its position and operation will be readily understood by any person conversant with the subject. It will also be understood that a single planting apparatus may be used efficiently on a smaller and more compact machine, or a greater number than two of them on a larger and more extended machine, if deemed desirable.

The operation of the machine is as follows: The hopper F being filled with potatoes or pieces of them, and the hopper H with fertilizing material, and the cultivator and coverer depressed to their proper position, the machine is moved by a team attached to its pole or tongue, causing the planting-wheels to rotate by means of the gearing described. The potatoes or pieces of them are taken up by the pockets in the periphery of the planting-wheel E as soon as the pockets pass the point where the two planting-wheels come in contact with each other, and are carried around, the knife G cutting off any portions projecting from the pocket beyond the line of the periphery, and dropped from the pockets into the mouth of the conductor L, from whence they fall to the ground into the trench or furrow prepared for them by the cultivator M, the false bottom in the pockets tending to remove them by its weight, so that they cannot be carried around by the planting-wheel. At the time that the pockets drop their charge the pins upon the side of the planting-wheel E strike the tail of the lever J and raise the valve I, and permits a specific quantity of the fertilizing material in the hopper H to drop through the tube K into the trench upon or near the potato, the valve closing, as described, as soon as the pins pass and release the tail of the lever. The earth thrown up by the cultivator, or as much of it as is requisite, is thrown back into the trench by the coverer to cover the potato and manure, and is pressed down by it to a proper degree through the shape and form given to the coverer. When the machine reaches the end of the trench to be made the cog-wheel C is thrown out of gear with the pinion D, the cultivator and coverer are raised by the lever Q, and the operation of the machine stopped, to be rendered, as before, when the machine is turned about to traverse the field in the reverse direction.

Although the machine is especially intended and fitted to plant potatoes, it may be used to plant any description of seed by filling up the pockets of the planting-wheel to diminish their size and capacity, so that no other planter than this would be required on a farm, and the expense attending the procurement of other machines would be saved.

It is well known that the labor of planting potatoes by hand, on account of their bulk and weight, is one of the most excessive connected with agricultural pursuits, and, although many attempts have been made to effect the purpose by machinery, they have proved unsuccessful from different causes, and they are yet universally planted by hand.

I claim that my improvements remedy and remove the defects and objections incident to and brought to bear against other machinery, and that it will accomplish its purpose in a perfect manner, with great saving of labor and with decided increase of the crop from the uniformity of the quantity of potatoes planted and of the distance that they are placed apart in the trench.

What I claim as my invention, and desire to secure by Letters Patent, is—

1. The combination of the planting-wheel E with the knife or cutting-blade G, to effect the purpose named, as set forth.

2. The combination of the planting-wheels E E' with the hopper F, when arranged in relation to each other in the manner and for the purposes described.

EDWARD E. HAWLEY.

Witnesses:
I. S. ELLIOTT,
CHARLES IVES.